(12) United States Patent
Taylor

(10) Patent No.: US 7,404,547 B2
(45) Date of Patent: *Jul. 29, 2008

(54) MULTI-COMPONENT END MEMBER ASSEMBLY AND AIR SPRING ASSEMBLY INCLUDING THE SAME

(75) Inventor: Robert W. Taylor, Indianapolis, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 358 days.

This patent is subject to a terminal disclaimer.

(21) Appl. No.: 11/191,191

(22) Filed: Jul. 27, 2005

(65) Prior Publication Data

US 2007/0023982 A1   Feb. 1, 2007

(51) Int. Cl.
*F16F 9/04* (2006.01)

(52) U.S. Cl. .................. 267/64.27; 267/64.24

(58) Field of Classification Search .............. 267/64.19, 267/64.21, 64.23, 64.24, 64.27
See application file for complete search history.

(56) References Cited

U.S. PATENT DOCUMENTS

| | | | |
|---|---|---|---|
| 2,704,665 A * | 3/1955 | Zoltok | ..................... 267/64.27 |
| 3,000,624 A | 9/1961 | Cisio | |
| 3,244,013 A | 4/1966 | Deschner | |
| 3,788,628 A | 1/1974 | Hotz, Jr. et al. | |
| 3,870,286 A | 3/1975 | Willich | |
| 4,037,305 A | 7/1977 | Larsson | |
| 4,489,474 A | 12/1984 | Brown et al. | |
| 4,564,177 A | 1/1986 | Leonard | |
| 4,573,692 A | 3/1986 | Frank et al. | |
| 4,629,170 A | 12/1986 | Warmuth, II | |
| 4,657,229 A | 4/1987 | Thurow | |
| 4,690,430 A | 9/1987 | Buma | |
| 4,718,650 A | 1/1988 | Geno | |
| 4,784,376 A | 11/1988 | Ecktman | |
| 4,787,606 A | 11/1988 | Geno et al. | |
| 4,787,607 A | 11/1988 | Geno et al. | |
| 4,793,598 A | 12/1988 | Geno et al. | |
| 4,852,861 A | 8/1989 | Harris | |
| 4,899,995 A | 2/1990 | Hoffman et al. | |
| 4,946,144 A | 8/1990 | Geno et al. | |
| 5,005,808 A | 4/1991 | Warmuth, II et al. | |
| 5,267,725 A | 12/1993 | Wode et al. | |
| 5,342,139 A | 8/1994 | Hoffman | |
| 5,374,037 A | 12/1994 | Bledsoe | |
| 5,460,354 A | 10/1995 | Easter | |
| 5,535,994 A | 7/1996 | Safreed, Jr. | |
| 5,859,692 A | 1/1999 | Ross, Jr. et al. | |
| 5,941,509 A | 8/1999 | Avesian et al. | |
| 6,036,180 A | 3/2000 | Ecktman | |
| 6,345,813 B1 | 2/2002 | Trowbridge | |
| 6,474,630 B1 | 11/2002 | Weitzenhof | |
| 6,513,798 B2 | 2/2003 | Capek et al. | |
| 6,520,492 B1 | 2/2003 | Branco et al. | |

(Continued)

FOREIGN PATENT DOCUMENTS

DE    41 18 577 A1    12/1992

(Continued)

*Primary Examiner*—Xuan Lan Nguyen
(74) *Attorney, Agent, or Firm*—Fay, Sharpe, Beall, Fagan, Minnich & McKee, LLP; Thomas R. Kinsbury

(57) ABSTRACT

An end member assembly includes a first end member and a second end member. An air spring assembly can be formed using an end member assembly on one end thereof. A method is also described.

24 Claims, 8 Drawing Sheets

U.S. PATENT DOCUMENTS

| | | |
|---|---|---|
| 6,561,500 B2 | 5/2003 | Schisler et al. |
| 6,619,635 B1 | 9/2003 | Hilburger et al. |
| 6,637,733 B1 | 10/2003 | Weitzenhof et al. |
| 6,698,730 B2 | 3/2004 | Easter |
| 6,749,184 B2 | 6/2004 | Wode et al. |
| 6,783,121 B2 | 8/2004 | Bank et al. |
| 2002/0153646 A1 | 10/2002 | Weitzenhof |
| 2004/0012131 A1 | 1/2004 | Bank et al. |
| 2006/0273501 A1* | 12/2006 | Taylor .................... 267/64.27 |

FOREIGN PATENT DOCUMENTS

| | | |
|---|---|---|
| DE | 103 40 091 A1 | 3/2005 |
| EP | 0 000 287 A1 | 1/1979 |
| EP | 442093 A1 * | 8/1991 |
| EP | 1 031 756 A2 | 8/2000 |
| GB | 911789 | 11/1962 |
| GB | 1 249 532 | 10/1971 |
| WO | WO 02/35112 A1 | 5/2002 |
| WO | WO 2004/067989 A1 | 8/2004 |
| WO | WO 2005/024265 A1 | 3/2005 |

* cited by examiner

MULTI-COMPONENT END MEMBER ASSEMBLY AND AIR SPRING ASSEMBLY INCLUDING THE SAME

BACKGROUND

The present novel concept broadly relates to the art of fluid suspension members and, more particularly, to a multi-component end member assembly suitable for use in forming an air spring assembly and a method of manufacturing the same.

Typical air spring assemblies include opposing end members and a flexible wall secured on the end members forming a spring chamber therebetween. A wide variety of arrangements for securing such a flexible wall on an end member are known and commonly used. It is recognized that different securing arrangements have different advantages, such as low cost, improved sealing or reliability, high strength, or a capability of disassembly and/or repair, for example. Thus, different securing arrangements are selected and used in different applications depending upon the specific needs and goals thereof. In many cases, a different securing arrangement will be selected and used on each of the two different end members of an air spring assembly.

Unfortunately, some securing arrangements and/or combination of arrangements can create assembly difficulties. This can undesirably limit the use of such arrangements and/or combination of arrangements. As an example, one securing arrangement includes a flexible wall secured on an outer side wall of an end member using a first retaining member. The flexible wall is then folded back over the retaining member and extends along the exterior thereof. A second retaining member can then optionally be secured outwardly of the first retaining member. The difficulty with assembling such securing arrangements is associated with positioning the flexible wall on the side wall of the end member prior to the securement of the first retaining member. Typically, this is due to the presence of a shoulder at one end of the outer side wall, though other features may also be present that can contribute to these assembly difficulties. The present novel concept overcomes the foregoing and other assembly difficulties.

BRIEF DESCRIPTION

An end member assembly in accordance with the present novel concept for use in forming an associated air spring assembly is provided that includes a first end member including a first end and a first side extending approximately transverse the first end. The first side at least partially forms an outermost extent of the first end member. A second end member includes a second end and a second side. The second end member is positioned adjacent the first end member with the second end disposed toward the first end. At least a portion of the second side extends outwardly beyond the first side.

An air spring assembly in accordance with the present novel concept is provided that includes a first end member including a first side wall, a second end member spaced from the first end member, and a flexible wall including opposing first and second ends. The first end of the flexible wall includes a first wall portion disposed along the first side wall of the first end member and a second wall portion spaced outwardly from the first wall portion. The second end is secured on the second end member. A retaining member is disposed along the first side wall portion of the flexible wall opposite the first side wall of the first end member. A third end member is positioned adjacent the first end member and engages at least one of the first end member or the flexible wall.

A method of manufacturing an air spring assembly in accordance with the present novel concept is provided that includes providing a first end member including a side wall, a second end member cooperative with the first end member and including an end wall, and a flexible wall including first and second open ends. The method also includes positioning a first portion of the flexible wall adjacent the first open end along the side wall of the first end member. The method further includes securing the flexible wall along the side wall and folding a second portion of the flexible wall outwardly of the first portion to form a folded wall portion therebetween. The method also includes positioning the second end member along the first end member such that the end wall is in an abutting engagement with the folded wall portion, and providing a third end member and securing the flexible wall adjacent the second opened end on the third end member.

DETAILED DESCRIPTION

Figure 1:
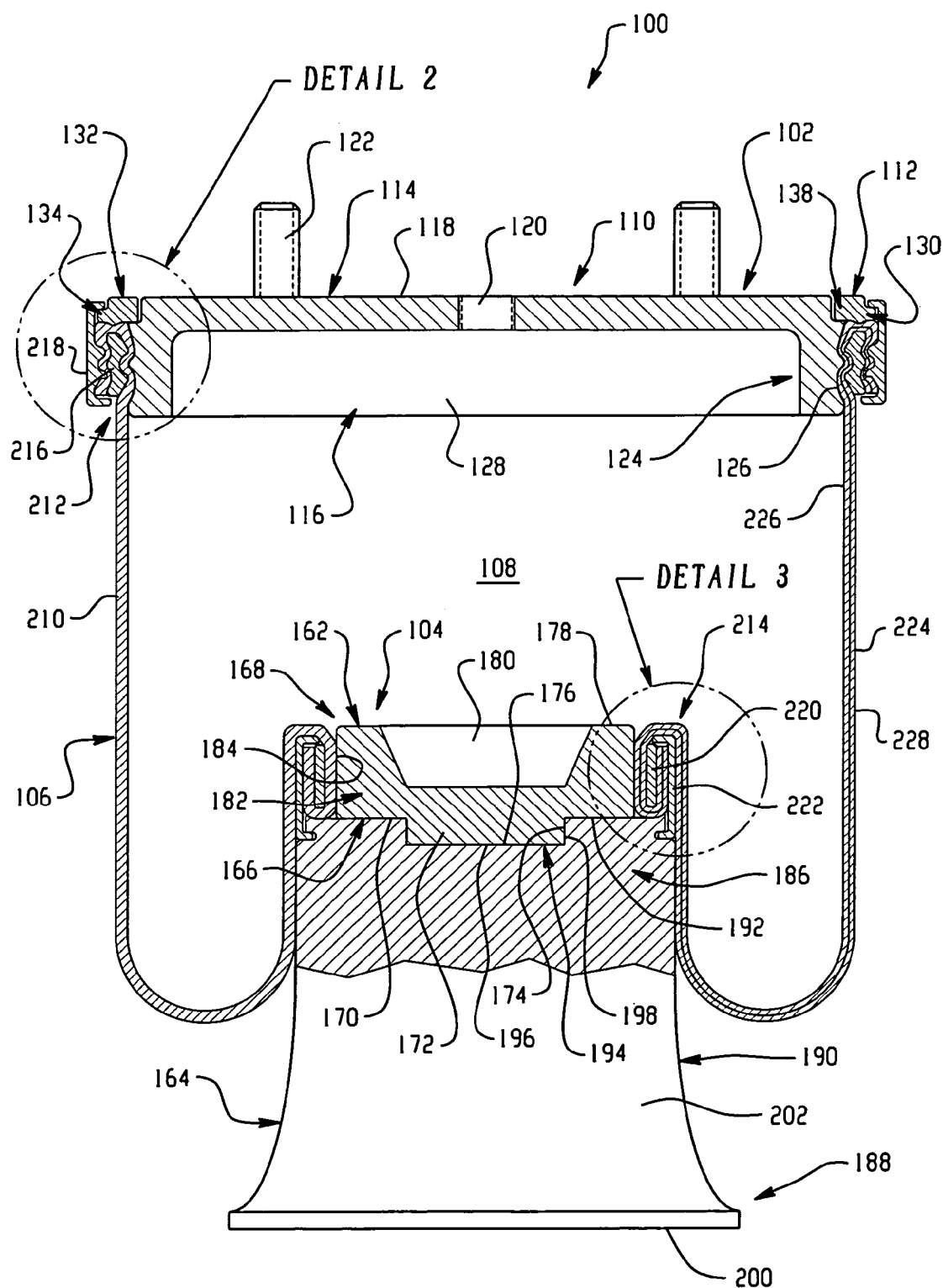
FIG. 1 is a cross-sectional side view of one exemplary embodiment of an air spring assembly in accordance with the present novel concept.
Figure 2:
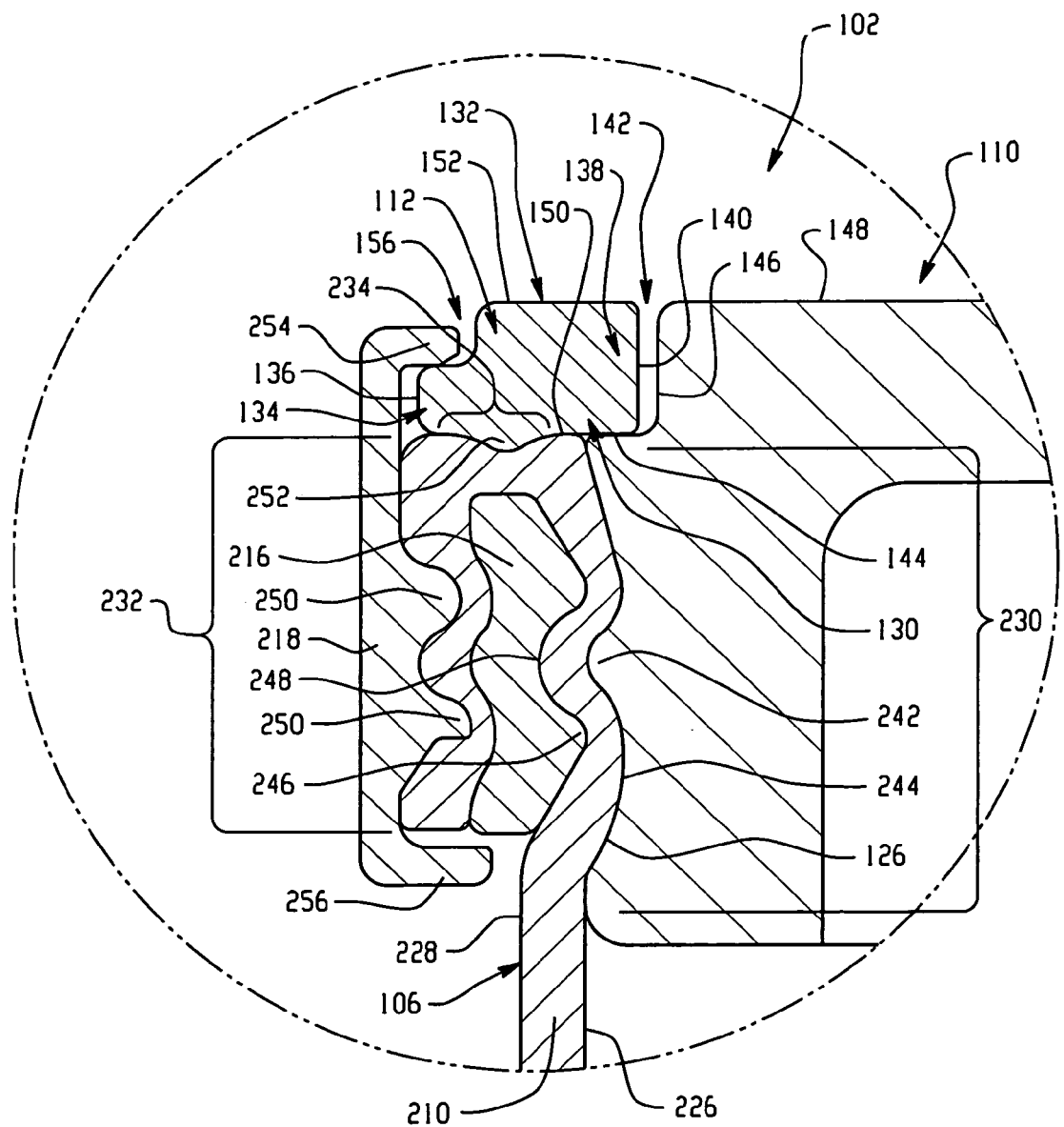
FIG. 2 is an enlarged detail view of the portion of the air spring assembly in DETAIL 2 of FIG. 1.
Figure 3:
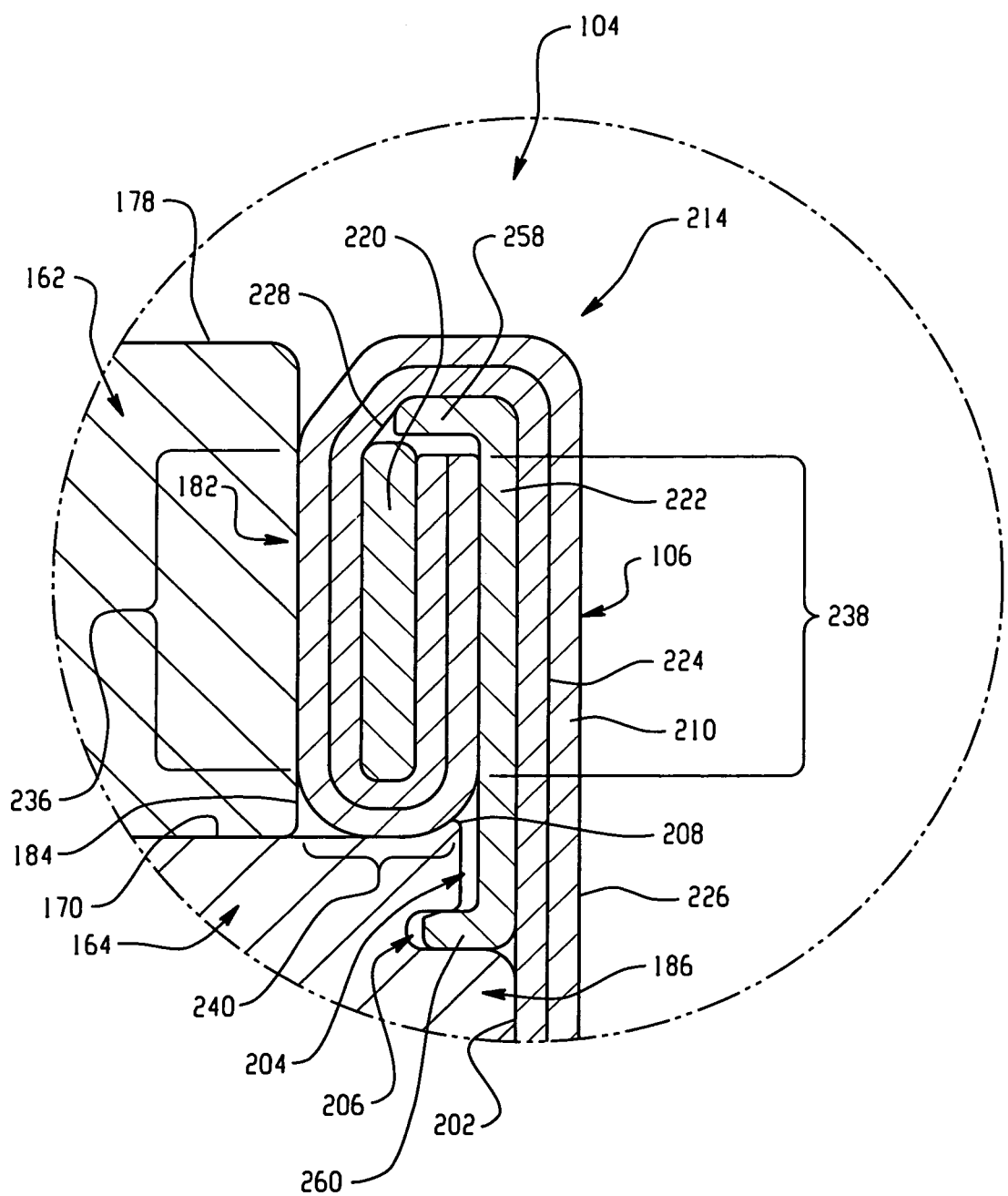
FIG. 3 is an enlarged detail view of the portion of the air spring assembly in DETAIL 3 of FIG. 1.

Turning now to the drawings wherein the showings are for the purpose illustrating exemplary embodiments of the present novel concept, and not for limiting the same, FIGS. 1-3 illustrate an air spring assembly 100 that includes a first or upper end member assembly 102 and a second or lower end member assembly 104. A flexible wall, such as a flexible sleeve 106, for example, is secured therebetween and at least partially defines a spring chamber 108. It will be appreciated that the air spring assemblies shown and described herein are often referred to as rolling lobe-type air spring assemblies. However, it is to be understood that the present novel concept is capable of broad use in association with any suitable type, kind and/or configuration of air spring assembly, including convoluted or bellows-type air spring assemblies, for example. Thus, the following discussion of the present novel concept, which includes particular reference to rolling lobe-type air spring assemblies, is merely exemplary. Furthermore, it will be understood that even though end member assemblies are shown in use on both ends of the air spring assemblies herein, use on both ends of an air spring assembly is entirely optional. That is, an end member assembly, such as first end member assembly 102 or second end member assembly 104, for example, can be used on either one or both ends of an air spring assembly without departing from the scope and intent of the present novel concept.

First end member assembly 102 includes a first end member 110 and a second end member 112. It will be appreciated that first end member 110 and second end member 112 as shown and described herein are merely exemplary of suitable end members, and that end members of any other type, kind and/or configuration could alternately be used. First end member 110 includes a first or closed end 114 and a second or open end 116. Closed end 114 includes a first end wall 118 having an optional threaded passage 120 extending therethrough and in fluid communication with spring chamber 108. Threaded passage 120 can be of any suitable shape, size and/or configuration, such as for receiving a threaded fitting (not shown), for example, to secure a corresponding fluid line (not shown) on air spring assembly 100.

Additionally, suitable securement members, such as mounting studs 122, for example, can be provided on first end wall 118 for mounting the air spring assembly on or along an associated structural member (not shown). First end member 110 also includes a first side 124 having a first side wall 126 that extends from first end wall 118 and at least partially forms a recess 128 in first end member 110. It will be appreciated, however, that recess 128 is optional and that any suitable first end member construction or arrangement could alternately be used, including end members with or without a recess. If included, however, a recess, can act to reduce weight and can increase the stroke length of the air spring and/or the volume of the spring chamber.

As can be better seen in FIG. 2, second end member 112 includes a first or proximal end 130, a second or distal end 132, a first or outer side 134 having an outer side wall 136, and a second or inner side 138 having an inner side wall 140. It will be appreciated, however, that inner side 138 is optional, in which case second end member 112 could be somewhat disk shaped, for example. Thus, it is to be understood that second end member 112 can take any suitable shape, form and/or configuration cooperative or otherwise complimentary to first end member 110 without departing from the principles of the present novel concept.

First end member 110 and second end member 112 include complimentary features or geometry suitable for indexing or otherwise registering the position of one end member to the other in at least one direction. It will be appreciated that any suitable features or combination of features can be used. For example, a first mating feature on first end member 114 can include an annular recess 142, such as that formed between or along first end 114 and first side 124, for example. The annular recess includes a recess bottom wall 144 and a recess side wall 146, and at least partially defines a boss or projection portion 148 of first end wall 118. A second mating feature on second end member 112 can, for example, include a first end wall 150 of proximal end 130, inner side wall 140 of inner side 138, and/or any other features or combination of these and/or other features.

In the exemplary embodiment shown, second end member 112 is supported on first end member 110 such that a portion of first end wall 150 of proximal end 130 is in abutting engagement with recess bottom wall 144 of annular recess 142. The remaining portion of first end wall 150 extends outwardly beyond first side wall 126 of first side 124 forming a shoulder (not numbered). Distal end 132 of second end member 112 includes a second end wall 152, and a relief 156 extends into second end member 112 from along second end wall 152 and/or outer side wall 136. Relief 156 can be a substantially continuous relief extending peripherally around the outer side and/or distal end of the second end member. Alternately, relief 156 can include two or more relief segments (not shown) spaced along and/or around the outer side and/or distal end of the second end member. Second end wall 152 is shown in substantial alignment with first end wall 118 of first end member 110. It will be appreciated, however, that the desirability of positioning these walls in substantial alignment will vary from application-to-application depending upon the attendant mounting arrangements and/or other factors. As such, in other exemplary embodiments one of these walls can alternately project outwardly beyond the other wall or a portion of the other wall, if desired.

Second end member assembly 104 includes a first end member 162 and a second end member 164. It will be appreciated that first end member 162 and second end member 164, as shown and described herein, are merely exemplary of suitable end members and that end members of any other type, kind and/or configuration could alternately be used. First end member 162 includes a first or closed end 166 and a second or open end 168. Closed end 166 includes a first end wall 170 and a boss or projection portion 172 extending from the first end wall. The projection portion includes a projection side wall 174 and a projection end wall 176. Open end 168 includes a second end wall 178 and a recess 180 extending into the first end member from along the second end wall. First end member 162 also includes a first side 182 having a first side wall 184. In one exemplary embodiment, first end member 162 is substantially cylindrical and includes only a single side. However, it will be appreciated that two or more sides can optionally be used in other embodiments.

Second end member 164 includes a first or proximal end 186, a second or distal end 188, and an outer side 190 extending therebetween. Proximal end 186 includes a first end wall 192, and a recess 194 formed inwardly along first end wall 192 and including a recess bottom wall 196 and a recess side wall 198. Distal end 188 includes a second end wall 200 suitable for engaging a structural support member, such as a vehicle suspension component (not shown), for example. One or more securement devices or features (not shown), such as mounting studs (not shown) or mounting holes (not shown), for example, will typically be included on or along second end wall 200. Outer side 190 includes an outer side wall 202 and can take any suitable shape, form and/or configuration. Additionally, second end member 164 can optionally include a relief 204 formed on or along first end wall 192 and/or outer side wall 202. Furthermore, a groove 206 can optionally be formed along or adjacent relief 204, and a projection 208 can be optionally provided along first end wall 192 and extend outwardly therefrom opposite distal end 188.

Flexible sleeve 106 includes a sleeve wall 210 extending between first and second open ends 212 and 214. Sleeve 106 is secured on first end member assembly 102 along first open end 212 using retaining members 216 and 218. Additionally, the sleeve is secured on second end member assembly 104 along second open end 214 using retaining members 220 and 222. Though both sets of retaining members 216-218 and 220-222 are shown in use in FIG. 1, it is to be specifically understood that use along both end member assemblies of an air spring assembly is optional. As such, dual retaining members of either construction can be used along either or both of the end member assemblies without departing from the present novel concept. Furthermore, flexible sleeve 106 can be of any suitable construction, such as a wall including elastomeric material, for example. Additionally, sleeve wall 210 can optionally include reinforcing cords 224 formed from any suitable construction or cord material. In one exemplary embodiment, sleeve wall 210 can be formed from rubber and can include reinforcing cords formed from nylon or aramid fibers.

Sleeve wall 210 includes an inside surface 226 generally disposed toward spring chamber 108 and an outside surface 228 facing opposite the inner surface. First open end 212 of sleeve wall 210 includes a first intermediate portion 230 of the sleeve wall, a first outer portion 232 and a first flexed portion 234 disposed therebetween. Similarly, second open end 214 of sleeve wall 210 includes a second intermediate portion 236, a second outer portion 238 and a second flexed portion 240 disposed therebetween. First intermediate portion 230 of first open end 212 is disposed along first end member 110 such that inside surface 226 is disposed along first side wall 126. Retaining member 216 is positioned along the first intermediate portion opposite first side wall 126. In one exemplary embodiment, retaining member 216 is a substantially circular ring that is swaged, crimped or otherwise mechanically inwardly deformed to compress first intermediate portion 230 and form a substantially fluid-tight seal with first side wall 126. The first side wall can optionally include sleeve-engaging features, such as a rib 242 and grooves 244, for example. Retaining member 216 can also optionally include sleeve-engaging features, such as ribs 246 and a groove 248, for example, which can optionally correspond to rib 242 and grooves 244, if provided.

First outer portion 232 of sleeve wall 210 extends along retaining member 216 outwardly thereof opposite first intermediate portion 230 such that inside surface 226 along first outer portion 232 is outwardly exposed and outside surface 228 along portions 232 and 234 is disposed along retaining member 216. Retaining member 218 is positioned adjacent inner surface 226 of outer portion 232 and acts to displace the outer portion toward retaining member 216. Additionally, retaining member 218 can optionally include sleeve-engaging features, such as ribs 250, for example.

First flexed portion 234 is formed between portions 230 and 232 due to the folding of sleeve wall 210 outwardly along retaining member 216. In one exemplary embodiment, first end wall 150 of second end member 112 is in abutting engagement with first flexed portion 234. Additionally, a sleeve-engaging feature, such as an annular rib or projection 252 can optionally be provided along first end wall 150 and abuttingly engage flexed portion 234. Furthermore, retaining member 218 can optionally include an inwardly extending flange or tab. In one exemplary embodiment, retaining member 218 includes an inwardly extending flange or tab 254 extending inwardly beyond outer side wall 136 of second end member 112 and into relief 156. Additionally, or in the alternative, a flange or tab 256 can extend inwardly along or beyond at least a portion of retaining member 216. If provided, flanges 254 and/or 256 are operative to secure sleeve wall 210 on and along first end member 110 by capturing one or more of second end member 112 and/or retaining member 216.

Second open end 214 is secured along first end member 162 such that second intermediate portion 236 is disposed along side wall 184 of side 182. Retaining member 220 is positioned along outside surface 228 of second intermediate portion 236 opposite side wall 184. In one exemplary embodiment, retaining member 220 is a substantially circular ring that is swaged, crimped or otherwise mechanically inwardly deformed to compress intermediate portion 236 and form a substantially fluid-tight seal with side wall 184. Retaining member 222 is disposed along second outer portion 238 in abutting engagement with inside surface 226. Retaining member 222 can optionally include one or more inwardly extending flanges or tabs, and in the exemplary embodiment shown, includes flanges or tabs 258 and 260 on opposing ends thereof. Flange 258 extends inwardly beyond at least a portion of retaining member 220, and flange 260 extends into groove 206 adjacent relief 204. The interengagement of retaining member 222 with retaining member 220 and/or groove 206 of second end member 164 acts to secure second end member assembly 104 together and retain flexible sleeve 106 thereon. If, however, one or more of flanges 258 or 260 are not provided, then second end member 164 could, in some arrangements, be separable from first end member 162. It will be appreciated, however, that in use, the force exerted by the air pressure in spring chamber 108 will tend to secure or maintain the first and second end members in abutting engagement.

Figure 4:
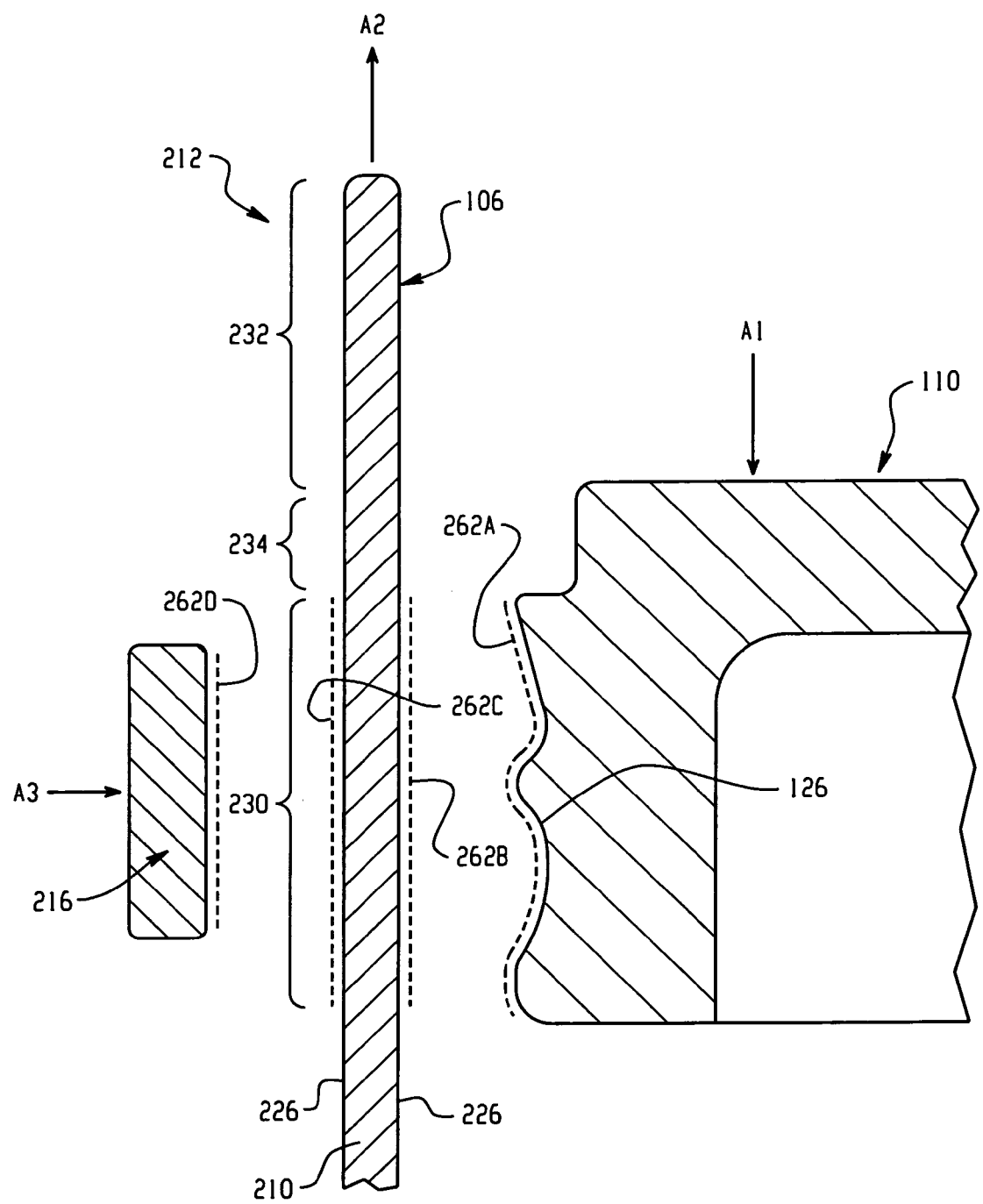
FIGS. 4-6 are enlarged detail views of the portion of the air spring assembly in FIG. 2 shown in successive stages of assembly.
Figure 5:
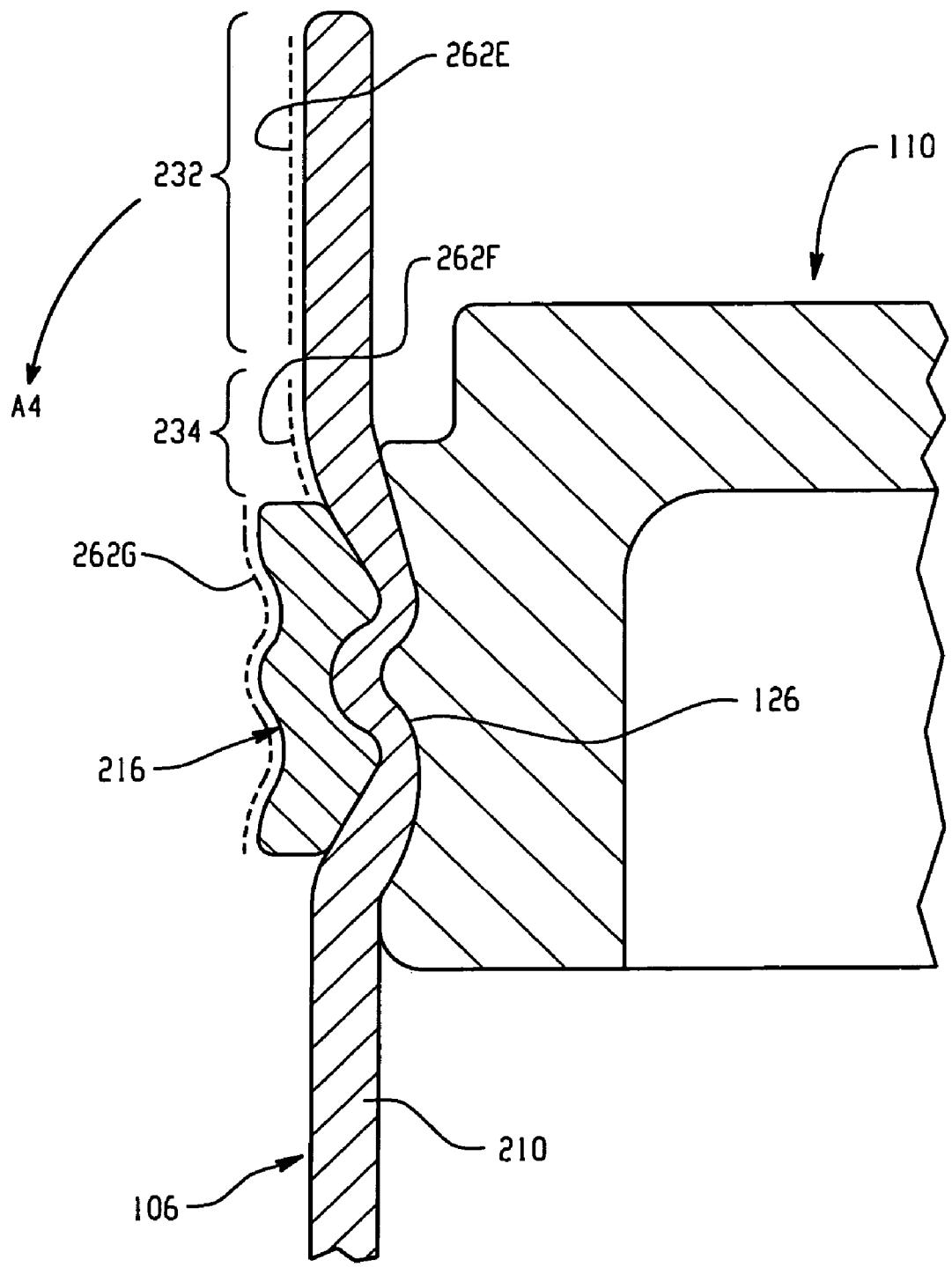
Figure 6:
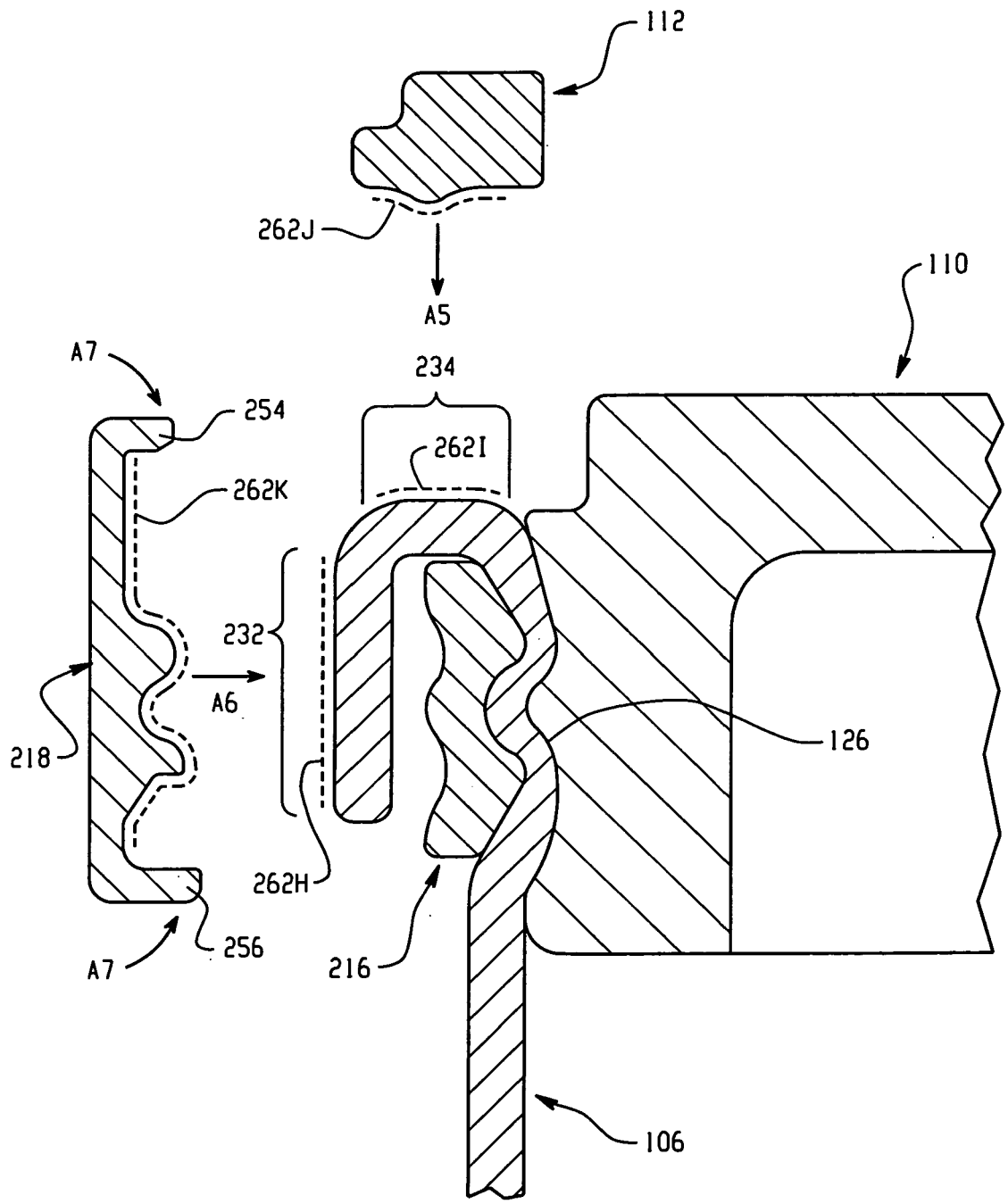

FIGS. 4-6 illustrate one exemplary embodiment of a method of assembling an air spring assembly in accordance with the present novel concept. FIG. 4 illustrates first end member 110, flexible sleeve 106 and retaining member 216 prior to assembly. It will be appreciated that exaggerated spacing is shown between the components in FIGS. 4-6 for the purposes of clarity. First end member 110 is received within first open end 212 such that first side wall 126 is adjacent first intermediate portion 230. The end member can be positioned within the open end of the flexible sleeve, as indicated by arrow A1. In the alternative, flexible sleeve 106 can be slid or otherwise moved onto and along the end member, as indicated by arrow A2. As another alternative, a combination of these two actions can also be used. Furthermore, it will be appreciated that the hoop strength of the flexible sleeve will tend to close the same inwardly around side wall 126.

Retaining member 216 is shown in FIG. 4 as being substantially cylindrical and is radially inwardly crimped or otherwise deformed to secure intermediate portion 230 on first side wall 126, as indicated by arrow A3. If provided, one or more ribs or grooves, such as ribs 246 (FIGS. 1 and 2) and groove 248 (FIGS. 1 and 2) can be fully or partially formed during this action. In the alternative, any sleeve-engaging features can be formed or otherwise provided during an earlier step or action, if desired. Prior to assembly, an adhesive and/or sealant can optionally be applied along any suitable walls, surfaces and/or features, such as first side 126, the inside and/or outside surfaces of first intermediate portion 230, and/or retaining member 216, for example, as indicated by dashed lines 262A, 262B, 262C and 262D, respectively. FIG. 5 illustrates a partially assembled condition in which intermediate wall portion 230 is secured on side wall 126 using retaining member 216. An adhesive and/or sealant can optionally be applied along any suitable walls, surfaces and/or features, such as outer portion 232, flexed portion 234 and/or retaining member 216, for example, as indicated by dashed lines 262E, 262F and/or 262G, respectively. Outer portion 232 of flexible sleeve 106 is thereafter folded outwardly along retaining member 216, as indicated by arrow A4, with first flexed portion 234 being disposed along one end of retaining member 216.

As shown in FIG. 6, second end member 112 is positioned along first end member 110 and engages flexed portion 234 of the flexible sleeve, as indicated by arrow A5. Retaining member 218 is positioned outwardly from outer portion 232 and is thereafter inwardly deformed to secure the outer portion against retaining member 216, as indicated by arrow A6. Additionally, flanges 254 and 256 are shown as being provided on retaining member 218 and respectively engage or extend inwardly beyond at least a portion of second end member 112 and retaining member 216. In the alternative, flanges 254 and 256 can be formed, as indicated by arrow A7, after the inwardly deforming action. Prior to assembly, an adhesive and/or sealant can be optionally applied along any suitable walls, surfaces and/or features, such as outer portion 232, flexed portion 234, end wall 150 and/or retaining member 218, for example, as indicated by dashed lines 262H, 262I, 262J and/or 262K, respectively. It will be appreciated, however, that the use of any adhesive, sealant or combination thereof is optional, and that any suitable adhesive and/or sealant can be used.

Figure 7:
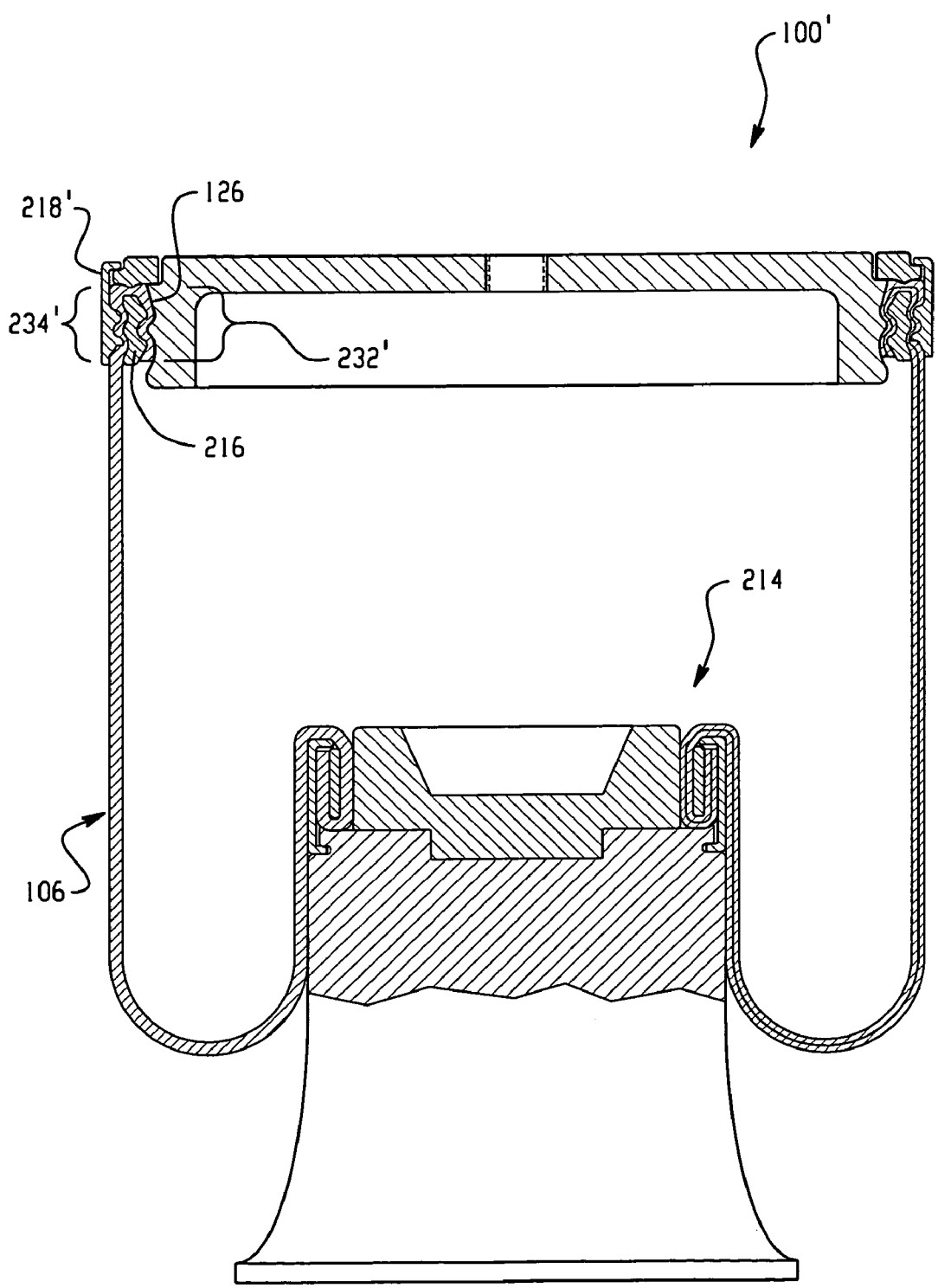
FIG. 7 is a cross-sectional side view of another exemplary embodiment of an air spring assembly in accordance with the present novel concept.

FIG. 7 illustrates another exemplary embodiment of an air spring assembly 100' in accordance with the present novel concept. It will be appreciated that air spring assembly 100' is substantially similar to air spring assembly 100 shown in FIGS. 1-6 and discussed in detail above with regard thereto. However, air spring assembly 100' differs from air spring assembly 100 in that outer portion 232' of flexible sleeve 106 is secured along first side wall 126 by retaining member 216. As such, intermediate portion 234' is folded outwardly along retaining member 216 and secured there against using retaining member 218'. Second open end 214 is secured along second end member assembly 104 in the manner discussed above with regard to air spring assembly 100.

Figure 8:
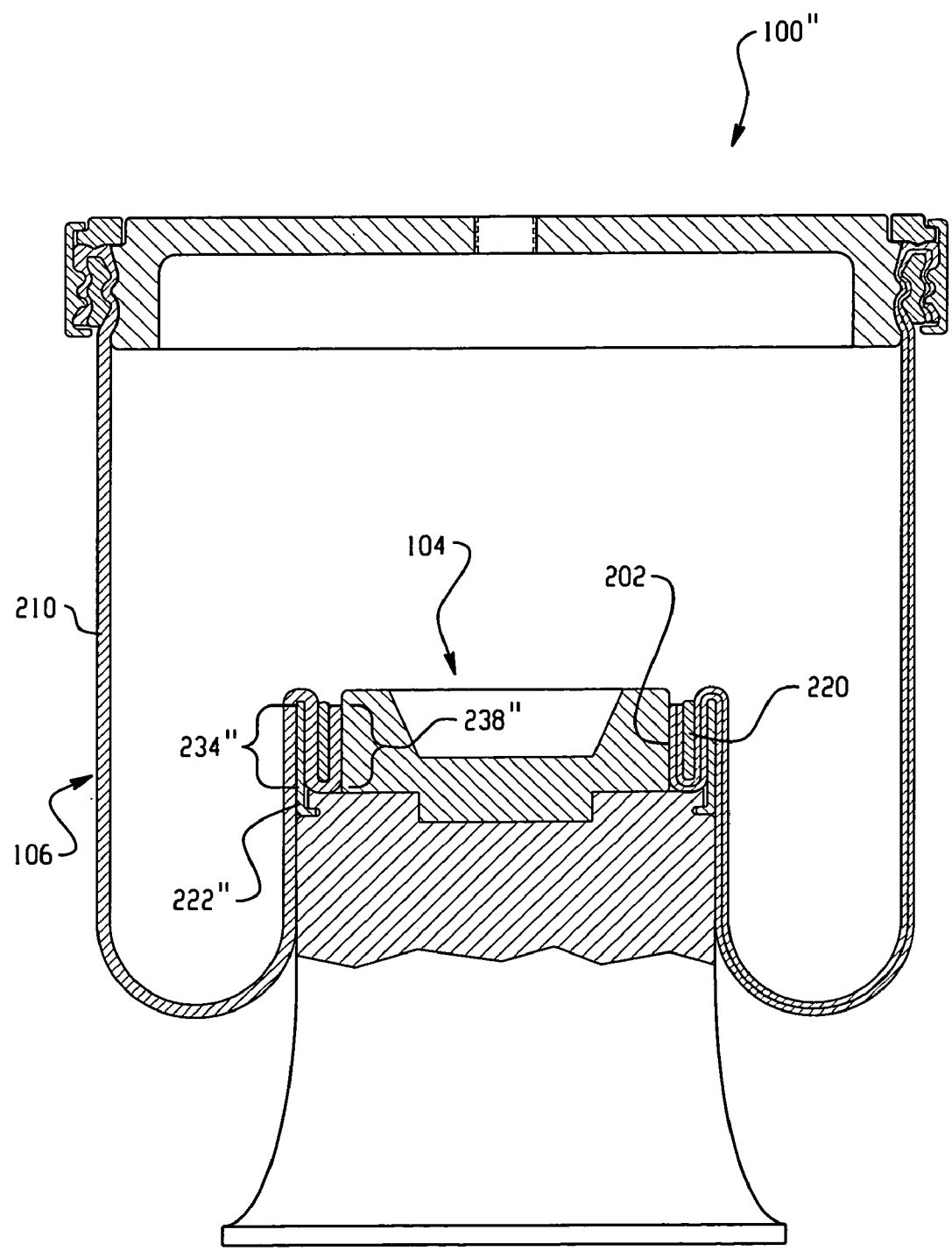
FIG. 8 is a cross-sectional side view of a further exemplary embodiment of an air spring assembly in accordance with the present novel concept.

An air spring assembly 100" is shown in FIG. 8 and is substantially similar to air spring assembly 100 discussed above. However, air spring assembly 100" differs from air spring assembly 100 in that flexible sleeve 106 is secured along lower end member assembly 104 in a slightly different manner. That is, second outer portion 238" of sleeve wall 210 is secured along outer side wall 202 using retaining member 220 and intermediate portion 234" is folded outwardly along retaining member 220 and secured thereto using a retaining member 222". It will be appreciated that retaining members 218' and 222" preferably include only one flange or tab to prevent binding or pinching of sleeve wall 210.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. An air spring assembly comprising:
   a first end member including a first end and a first side wall;
   a second end member spaced from said first end member;
   a flexible wall including opposing first and second ends, said first end disposed along said first end member and including a first wall portion, a second wall portion spaced outwardly from said first wall portion, and a flexed wall portion disposed between said first and second wall portions of said first end, said second end of said flexible wall secured on said second end member;
   a retaining member disposed along said first wall portion of said flexible wall opposite said first side wall of said first end member; and,
   a third end member positioned adjacent said first end member, said third end member disposed in abutting engagement with said first end member and said flexed wall portion of said first end of said flexible wall.

2. An air spring assembly according to claim 1, wherein said first end member includes at least one of a recess and a projection and said third end member includes the other of a recess or a projection.

3. An air spring assembly according to claim 1, wherein said first end member and said third end member together form one of a cap assembly or a piston assembly.

4. An air spring assembly according to claim 1 further comprising a fourth end member positioned adjacent said second end member and engaging at least one of said second end member and said flexible wall.

5. An air spring assembly according to claim 1 further comprising one of an adhesive and a sealant disposed along said first end of said flexible wall.

6. An air spring assembly comprising:
   a first end member including a first end and a first side wall;
   a second end member spaced from said first end member;
   a flexible wall including opposing first and second ends, said first end disposed along said first end member and including a first wall portion and a second wall portion spaced outwardly from said first wall portion, said second end of said flexible wall secured on said second end member;
   a first retaining member disposed along said first wall portion of said flexible wall opposite said first side wall of said first end member;
   a second retaining member disposed along said second wall portion of said flexible wall; and,
   a third end member positioned adjacent said first end member and engaging at least one of said first end member and said flexible wall.

7. An air spring assembly according to claim 6, wherein at least part of said second wall portion is compressed between said first retaining member and said second retaining member.

8. An air spring assembly according to claim 7, wherein said first retaining member includes an outer surface and said third end member includes an outer side wall, and at least a portion of said second retaining member extends inwardly beyond at least one of said outer surface of said first retaining member and said outer side wall of said third end member.

9. A method of manufacturing an air spring assembly comprising:
   a) providing a first end member including a side wall, a second end member cooperative with said first end member and including an end wall, and a flexible wall including first and second open ends;
   b) positioning a first portion of said flexible wall adjacent said first open end along said side wall of said first end member;
   c) providing a first retaining member and securing said flexible wall along said side wall using said first retaining member;
   d) folding a second portion of said flexible wall outwardly of said first portion to form a folded wall portion therebetween;
   e) positioning said second end member along said first end member such that said end wall of said second end member is in abutting engagement with said folded wall portion;
   f) providing a second retaining member and securing said second wall portion using said second retaining member;
   g) securing said second end member along said first end member; and,
   h) providing a third end member and securing said flexible wall adjacent said second open end on said third end member.

10. A method according to claim 9, wherein securing said second end member along said first end member in g) includes securing said second end member using said second retaining member.

11. A method according to claim 10, wherein securing said second end member using said second retaining member includes forming a radially inwardly-projecting flange along said second retaining member that projects radially inwardly beyond at least a portion of said second end member.

12. A method according to claim 11, wherein providing a second end member in a) includes providing a second end member including a recess extending circumferentially thereabout, and forming said radially inwardly-extending flange along said second retaining member includes forming said radially inwardly-extending flange into said recess.

13. A method according to claim 9, wherein said second retaining member includes opposing ends, and said method further comprises forming a radially inwardly-extending flange along at least one of said opposing ends.

14. A method according to claim 13, wherein forming a radially inwardly-extending flange along at least one of said opposing ends includes forming a flange extending radially inwardly beyond at least a portion of said first retaining member.

15. A method of assembling an air spring, said method comprising:
   a) providing:
      a first end member including a first end wall and a first side wall extending approximately transverse to said first end wall, said first side wall having an outermost dimension;
      a second end member being cooperative with said first end member and including a second side wall having a greater outermost dimension than said first side wall of said first end member and a second end wall extending approximately transverse to said second side wall;
      a third end member; and,
      a flexible wall extending longitudinally between opposing first and second ends, said flexible wall including a first wall portion disposed along said first end, a second wall portion spaced longitudinally-inwardly from said first end and a third wall portion disposed between said first and second wall portions;
   b) positioning said flexible wall along said first side wall of said first end member such that said first wall portion is capable of extending beyond said first end member with said second wall portion disposed along said first side wall of said first end member;
   c) providing a first retaining member and securing said second wall portion of said flexible wall along said first end member using said first retaining member;
   d) folding said first wall portion of said flexible wall outwardly of said second wall portion such that said third wall portion forms an outermost longitudinal extent of said flexible wall;
   e) providing a second retaining member and securing said first wall portion along said first end member using said second retaining member;
   f) positioning said second end member in cooperative engagement along said first end member such that said second end wall is in abutting engagement with said third wall portion of said flexible wall and securing said second end member along said first end member; and,
   g) securing said second end of said flexible wall along said third end member.

16. A method according to claim 15, wherein securing said second wall portion in c) includes positioning said first retaining member adjacent said second wall portion of said flexile wall and deforming at least a portion of said first retaining member toward said second wall portion.

17. A method according to claim 16, wherein said first side wall of said first end member includes at least one of a groove and a projection, and deforming at least a portion of said first retaining member toward said second wall portion includes conforming said second wall portion to said at least one of a groove and a projection.

18. A method according to claim 15, further comprising applying one of an adhesive and a sealant along at least one of said flexible wall, said first end member and said second end member.

19. A method according to claim 15, wherein said first end member includes a longitudinally-extending axis and at least one of an axially-extending recess and an axially-extending boss, and positioning said second end member in cooperative engagement along said first end member in f) includes interengaging said second end member and said at least one of an axially-extending recess and an axially-extending boss of said first end member.

20. A method according to claim 15, wherein securing said second end member along said first end member in f) includes forming a radially inwardly-extending flange along said second retaining member that projects radially inwardly beyond at least a portion of said second end member.

21. A method according to claim 20, wherein providing a second end member in a) includes providing a second end member including a recess extending circumferentially thereabout, and forming said radially inwardly-extending flange along said second retaining member includes forming said radially inwardly-extending flange into said recess.

22. A method according to claim 15, wherein said second retaining member includes opposing ends, and said method further comprises forming a radially inwardly-extending flange along at least one of said opposing ends.

23. A method according to claim 22, wherein forming a radially inwardly-extending flange along at least one of said opposing ends includes forming a flange extending radially inwardly beyond at least a portion of said first retaining member.

24. A method of assembling an air spring, said method comprising:
   a) providing an end member assembly including a first component and a second component, said first component including a side wall and a first outermost radial extent, and said second component including an end wall and a second outermost radial extent that is greater than said first outermost radial extent;
   b) providing a piston including an outside wall;
   c) providing a sleeve including first and second ends;
   d) placing a first section of said sleeve adjacent said first end along said side wall and bordering said first outermost radial extent of said end member assembly;
   e) securing said sleeve along said side wall;
   f) folding a second section of said sleeve away from said first section to form a folded section;
   g) positioning said second component in abutting engagement with said first component and said folded section and securing said first component to said second component; and,
   h) securing said piston along said second end of said sleeve such that a portion of said sleeve is disposed along said outside wall of said piston.

* * * * *